United States Patent
Mantell (10) Patent No.: US 6,608,700 B1
(45) Date of Patent: Aug. 19, 2003

(54) REMOVAL OF ERROR DIFFUSION ARTIFACTS WITH ALTERNATING DISTRIBUTION WEIGHTS

(75) Inventor: David A. Mantell, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,732

(22) Filed: Nov. 24, 1999

(51) Int. Cl.$^7$ ................................................. B41B 1/46
(52) U.S. Cl. .......................................... 358/1.9; 358/515
(58) Field of Search .......................... 358/1.9, 3, 3.01, 358/3.03, 3.04, 448, 515, 518, 521, 525, 526, 534; 382/252

(56) References Cited

U.S. PATENT DOCUMENTS

| | | | |
|---|---|---|---|
| 5,034,990 A | 7/1991 | Kless | 382/252 |
| 5,045,952 A | 9/1991 | Eschbach | 358/447 |
| 5,325,211 A | 6/1994 | Eschbach | 358/466 |
| 5,353,127 A | 10/1994 | Shiau | 358/458 |
| 5,434,672 A | 7/1995 | McGuire | 358/296 |
| 5,592,592 A | 1/1997 | Shu | 358/1.9 |
| 5,621,545 A | 4/1997 | Motta et al. | 358/518 |
| 5,642,204 A | 6/1997 | Wang | 358/455 |
| 5,692,109 A | 11/1997 | Shu | 358/1.9 |
| 5,696,601 A | 12/1997 | Metcalfe et al. | 358/447 |
| 5,737,453 A | 4/1998 | Ostromoukhov | 382/275 |
| 5,748,785 A | 5/1998 | Mantell et al. | 382/237 |
| 5,784,496 A | 7/1998 | Mantell | 382/237 |
| 5,835,238 A | 11/1998 | Mantell | 358/458 |
| 5,835,687 A | 11/1998 | Brown et al. | 395/109 |
| 5,847,724 A | 12/1998 | Mantell | 347/15 |
| 5,870,503 A | 2/1999 | Kumashiro | 382/252 |
| 5,880,857 A | 3/1999 | Shiau et al. | 358/456 |
| 5,903,361 A | 5/1999 | Shiau et al. | 358/455 |
| 5,917,614 A | 6/1999 | Levien | 358/456 |
| 5,930,010 A | 7/1999 | Cheung et al. | 358/534 |
| 5,931,960 A * | 8/1999 | Kletter et al. | 358/3.03 |
| 6,185,006 B1 * | 2/2001 | Yoshida | 358/1.9 |
| 6,195,468 B1 * | 2/2001 | Yoshida | 382/251 |
| 6,252,585 B1 * | 6/2001 | Van Splunter et al. | 345/549 |
| 6,341,841 B1 * | 1/2002 | Shimada et al. | 347/43 |
| 2002/0008887 A1 * | 1/2002 | Horikoshi et al. | 359/9 |
| 2002/0085055 A1 * | 7/2002 | Shimada et al. | 347/15 |
| 2002/0097456 A1 * | 7/2002 | Yamada et al. | 358/536 |

FOREIGN PATENT DOCUMENTS

| | | |
|---|---|---|
| EP | 0654940 A1 | 5/1995 |
| EP | 0702482 A2 | 3/1996 |
| EP | 0581561 B1 | 4/1997 |

OTHER PUBLICATIONS

Eschbach, R et al. (1984) "Analytic Description Of The 1–D Error Diffusion Technique For Halftoning" *Optics Communications*, vol. 52(3), pp. 165–168.

Jae Ho Kim et al. (1995) "New edge–enhanced error diffusion algorithm based on the error sum criterion", *Journal of Electronic Imaging*, vol. 4(2), pp. 172–178.

Roeting, Paul G, (1976) "Halftone method with edge enhancement and Moire suppression", *J. Opt. Soc Am.*, vol. 66(10), pp. 985–989.

* cited by examiner

Primary Examiner—Mark Wallerson
(74) Attorney, Agent, or Firm—Fay, Sharpe, Fagan, Minnich & McKee, LLP (57) ABSTRACT

The present invention provides method and systems for processing a continuous-tone image, represented by a plurality of pixels, to provide an encoded display image suitable for printing on a print medium. The method of the invention distributes fractional weighted portions of an error, indicative of a difference between the color value of each electronically encoded pixel and an output state representing the pixel on the print medium, to selected subsequent pixels. The fractional portions are selected based on the color value of the pixel being processed and its position relative to the other pixels. The method of the invention advantageously reduces error diffusion artifacts in the printed image.

19 Claims, 6 Drawing Sheets

| gray levels | 0 - 55<br>200- 255 | 56 - 71<br>184 - 199 | 72 - 87<br>168 - 183 | 88 - 103<br>152 - 167 | 104 - 119<br>136 - 151 | 120 - 135 |
|---|---|---|---|---|---|---|
| Set A weights | | | | | | |
| ( n +1, m ) | 8/16 | 8/16 | 8/16 | 8/16 | 8/16 | 8/16 |
| ( n +1, m +1 ) | 0 | 2/16 | 4/16 | 6/16 | 6/16 | 8/16 |
| ( n +1, m ) | 4/16 | 2/16 | 0/16 | 0/16 | 0/16 | 0/16 |
| ( n +1, m -1 ) | 2/16 | 2/16 | 2/16 | 2/16 | 2/16 | 0/16 |
| ( n +1, m -2 ) | 1/16 | 1/16 | 2/16 | 0/16 | 0/16 | 0/16 |
| ( n +1, m -3 ) | 1/16 | 1/16 | 0/16 | 0/16 | 0/16 | 0/16 |
| | | | | | | |
| Set B weights | | | | | | |
| ( n' +1, m' ) | 8/16 | 8/16 | 8/16 | 8/16 | 8/16 | 8/16 |
| ( n' +1, m' +1 ) | 0 | 4/16 | 0/16 | 0/16 | 0/16 | 0/16 |
| ( n' +1, m' ) | 4/16 | 2/16 | 6/16 | 6/16 | 6/16 | 8/16 |
| ( n' +1, m' -1 ) | 2/16 | 2/16 | 2/16 | 2/16 | 2/16 | 0/16 |
| ( n' +1, m' -2 ) | 1/16 | 2/16 | 0/16 | 0/16 | 0/16 | 0/16 |
| ( n' +1, m' -3 ) | 1/16 | 0/16 | 0/16 | 0/16 | 0/16 | 0/16 |

Table 1: weight sets for edge enhancement factor = 1

| gray levels | 0 - 71 184 - 255 | 72 - 87 168 - 183 | 88 - 103 152 - 167 | 104 - 119 136 - 151 | 120 - 135 |
|---|---|---|---|---|---|
| Set A weights | | | | | |
| ( n +1, m ) | 8/16 | 8/16 | 8/16 | 8/16 | 8/16 |
| ( n +1, m +1 ) | 0/16 | .5/16 | 1/16 | 1.5/16 | 2.5/16 |
| ( n +1, m ) | 4/16 | 3.5/16 | 3/16 | 2.5/16 | 1.5/16 |
| ( n +1, m -1 ) | 2/16 | 2/16 | 2/16 | 2/16 | 2/16 |
| ( n +1, m -2 ) | 1/16 | 1/16 | 1/16 | 1/16 | 1/16 |
| ( n +1, m -3 ) | 1/16 | 1/16 | 1/16 | 1/16 | 1/16 |
| | | | | | |
| Set B weights | | | | | |
| ( n' +1, m' ) | 8/16 | 8/16 | 8/16 | 8/16 | 8/16 |
| ( n' +1, m' +1 ) | 0/16 | 0/16 | 0/16 | 0/16 | 0/16 |
| ( n' +1, m' ) | 4/16 | 4/16 | 4/16 | 4/16 | 4/16 |
| ( n' +1, m' -1 ) | 2/16 | 2/16 | 2/16 | 2/16 | 2/16 |
| ( n' +1, m' -2 ) | 1/16 | 1/16 | 1/16 | 1/16 | 1/16 |
| ( n' +1, m' -3 ) | 1/16 | 1/16 | 1/16 | 1/16 | 1/16 |

Table 2: weight sets for edge enhancement factor = 4

REMOVAL OF ERROR DIFFUSION ARTIFACTS WITH ALTERNATING DISTRIBUTION WEIGHTS

BACKGROUND OF THE INVENTION

The present invention relates to methods and systems for processing a continuous-tone image to provide an encoded display image suitable for printing on a print medium. More particularly, the present invention provides a method of error diffusion that reduces long-range artifacts in a printed image.

Computer-generated images and images formed by photographic techniques have typically continuous tonality. That is, each pixel of such a continuous-tone image has a color value, such as a "gray scale" value, that lies in a particular range. For example, if an 8-bit word represents such a pixel, the pixel can have 256 distinct color values. Printing devices, such as laser or ink-jet printers, represent such an image by printing a plurality of picture elements or pixels on a print medium. Such printers, however, typically provide only a few output states, i.e., color value levels, for each printed pixel. For example, ink jet printers, typically operate with two levels. That is, these printers typically print a pixel either as a color dot on a print medium or leave the location of the pixel blank.

Accordingly, before printing an image, the pixels are preprocessed by comparing the color value of each pixel with one or a number of thresholds, to assign to each pixel one of a set of output states, for example color or blank in a binary system. The difference between the value of each pixel and the value of the output state representing the pixel introduces quantization artifacts into the printed image.

A number of error diffusion methods, such as the method described in U.S. Pat. No. 5,325,211, for ameliorating such artifacts are known in the art. Such error diffusion methods typically forwardly distribute fractional portions of the quantization error associated with a pixel to a selected group of pixels or to a set of neighboring pixels in an image. Conventional error diffusion methods, however, generally create a number of artifacts. One such artifact, commonly referred to as "worms", become noticeable for relatively large regions of uniform or gradually varying color. The "worms" appear as curved or straight diagonal lines in areas of uniform gray or produce a patterned appearance in the image. Another type of artifact, typically referred to as "limit cycle patterns" occur, for example, in an 8-bit system around pixels having color values 85, 128, and 170. Fan and Eschbach analyzed such 'limit cycle patterns' in a paper entitled "Limit cycle behavior of error diffusion", published in Proceedings of the 1994 $1_{st}$ IEEE International Conference on Image Processing, Austin, Tex., pages 1041–1045, and herein incorporated by reference. Fan and Eschbach found that the stability of such patterns creates problems at nearby gray levels because the pattern extends over large portions of the image until sufficient error is accumulated to disrupt it. Such a disruption is typically pronounced enough to be visible as a defect in a uniform field.

Accordingly, it is an object of the present invention to provide a method for converting a continuous-tone image to a display image for printing, which reduces artifacts in the printed image.

SUMMARY OF THE INVENTION

The present invention provides a method for converting a continuous-tone image represented by a plurality of electronically encoded pixels into an encoded display image for electronic printing. The method of the invention selects each electronically encoded pixel sequentially, and compares the color value of the selected pixel with selected thresholds. Subsequently, the method selects an output state from a set of states, for example one of a set of binary states, based on a comparison of the color value of the selected electronically encoded pixel with the selected thresholds, for displaying the pixel on a print medium. In a subsequent step, the method obtains an error value indicative of a difference between the selected output state and the color value of the pixel, and modifies the color value of each of a selected group of subsequent pixels, which are to be processed in a similar manner after processing the selected pixel, by a weighted fractional portion of the error value. The method of the invention selects the weighted fractional portions based on the color value of the selected pixel, i.e., the pixel being processed, and also based on the position of this pixel in the image. The steps delineated above are repeated for all of the electronically encoded pixels to convert the continuous-tone image into an encoded display image for electronic printing.

In one aspect, the method of the invention selects the weighted fractional error portions such that their sum is one. In another aspect, the method selects the electronically encoded pixels sequentially in a raster pattern.

According to another aspect of the invention, the electronically encoded pixels form a two-dimensional array to represent an image. One preferred practice of the invention divides such a two-dimensional array into a plurality of segments and selects the weighted fractional portions such that two pixels residing in the same segment and having color values in a selected range have the same weighted fractional portions.

In another aspect, the method of the invention selects the weighted fractional portions to be the same for a selected plurality of contiguous pixels in at least one of the plurality of segments into which an array of electronically encoded pixels is divided.

Another aspect of the invention relates to an image processing system for converting a plurality of electronically encoded pixels, stored for example in an input buffer, into an encoded display image for electronic printing. An image processing system according to the invention includes a buffer controller for sequentially selecting one of the pixels stored in the input buffer. A first summing circuit receives the color value of the selected pixel and modifies the color value based on a fractional error value obtained from a previously processed pixel, to obtain a modified color value. An image register receives the modified color value and temporarily stores the value. A comparator receives the modified value from the image register and compares the modified value with a selected threshold and chooses one of a plurality of output states based on the comparison, where the selected output state represents the selected electronically encoded pixel in the printed image. A change sign inverter receives the selected output state and produces a sign-inverted output state. A second summing circuit receives the modified color value and the sign-inverted output state to produce an error value that is indicative of a difference between the modified color value and the output state. A modifier receives the error value from the summing circuit, and receives a weighted fraction according to the teachings of the invention from a look-up table and modifies the error value based on the weighted fraction, to obtain a fractional error value. The weighted fraction is selected based on the color value of the selected pixel and its position within the electronically encoded image according to the teachings of the present invention. The fractional error value is stored in an error buffer, to be applied to a subsequent pixel.

In another aspect, the image processing system optionally includes a threshold modifier that receives the color value of the selected pixel and calculates a threshold modifying value based on the color value of the pixel and a selected multiplier. Further, a threshold calculation subtractor receives the threshold modifying value and subtracts the threshold modifying value from a nominal threshold value, to obtain the selected threshold for a pixel being processed.

Another aspect of the invention provides a printer for printing an image of a continuous-tone representation of a plurality of electronically encoded pixel, where each pixel specifies a color value, as a pattern of dots on a print medium. Each dot represents a selected output state value. The printer includes an error diffuser that receives the plurality of pixel values and converts the pixel values into an encoded display image. In particular, the diffuser distributes a difference between a color value of a pixel and the output state value of a dot representing the pixel to selected subsequent pixels based on the color value of the pixel and its location relative to the other pixels in the continuous-tone representation. A printing mechanism receives the encoded display image and generates the pattern of dots on the print medium.

In one aspect, the printer provides a two dimensional array of dots representing a two-dimensional array of electronically encoded pixels. In another aspect, the diffuser provides a plurality of weighted fractional portions based on the difference between the color value of a pixel and the output state value associated with a previous pixel and adds these fractional portions to selected subsequent pixels.

Illustrative embodiments of the present invention will be described below relative to the following drawings.

ILLUSTRATIVE EMBODIMENTS

Figure 1:
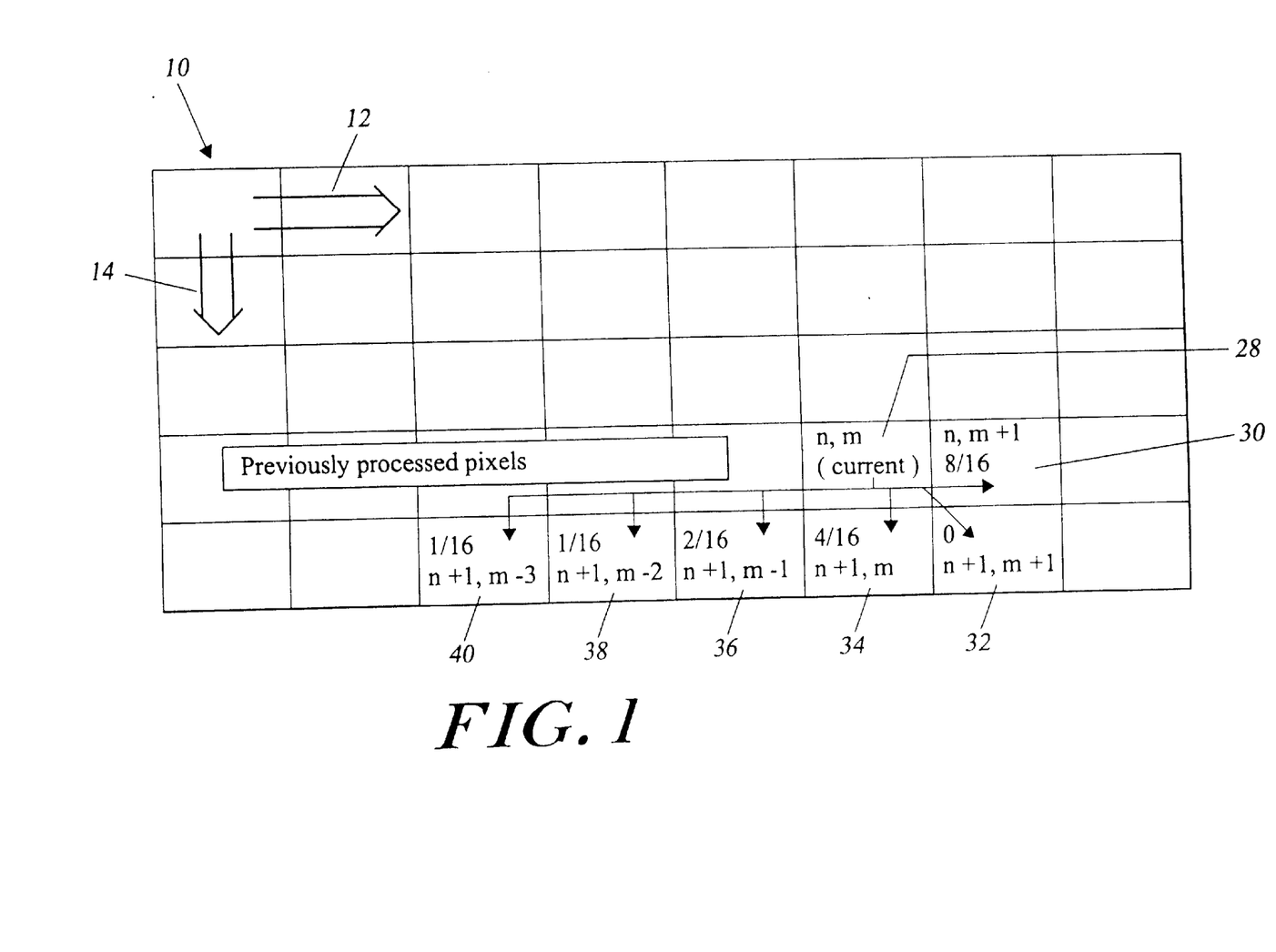
FIG. 1 is a schematic depiction of an array of electronically encoded pixels representing a continuous-tone image, and further illustrating the distribution of an error value associated with a pixel to a selected group of subsequent pixels according to the method of the invention.

The present invention provides a method and apparatus for converting a continuous-tone image to a display image suitable for electronic printing. The method of the invention has a number of advantages over conventional error diffusion methods, such as reducing the artifacts in the printed image that are typically associated with such conventional methods. The method of the invention may be practiced on a two-dimensional array of pixels, such as an array 10 in FIG. 1, which provides a digital luminance map of a continuos-tone image. Each cell in the array 10, shown in FIG. 1, schematically represents a pixel of the image. A preferred practice of the invention processes the pixels in each line of the image sequentially from left to right, shown for example by an arrow 12, and processes the lines of the image in a top-to-bottom order, as shown by an arrow 14. This type of sequential processing of the pixels is herein referred to as a raster pattern.

Figure 2:
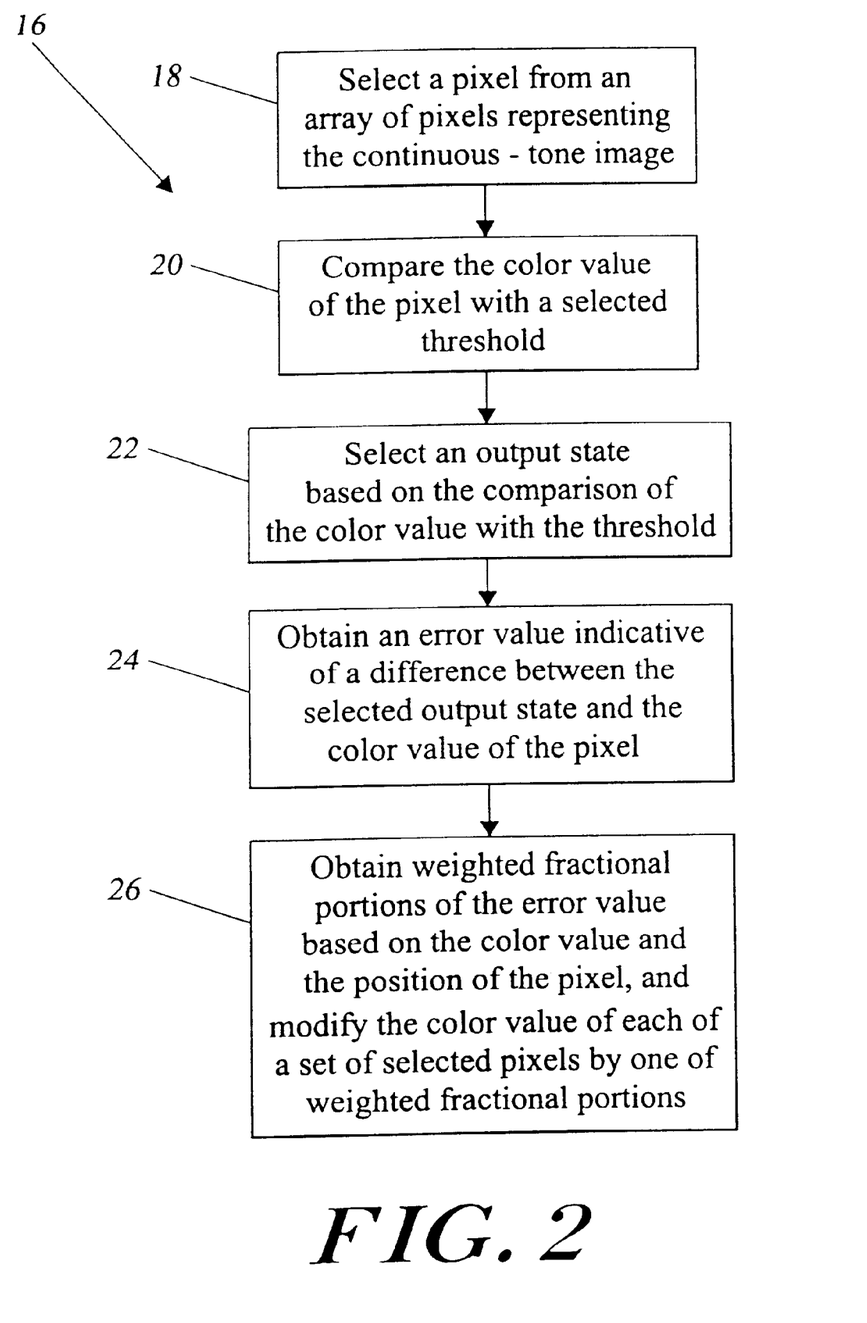
FIG. 2 is a flow chart depicting the various steps of a preferred embodiment of a method according to the teachings of the present invention for converting a continuous-tone image into an encoded display image.

FIG. 2 is a flowchart 16 that illustrates steps performed in an illustrative embodiment of the invention for converting a continuous-tone image represented by electronically encoded pixels, such as the array 10 of FIG. 1, into an encoded display image for electronic printing. The illustrative embodiment in step 18 selects a pixel from an array of pixels representing the continuous-tone image, in a sequential manner, for example in a raster pattern, i.e., selects pixels in each line sequentially from left to right with the lines selected in a top-to-bottom order. Each selected pixel has a color value, for example, a gray scale value ranging from 0 to 255. In a step 20, the method compares the color value of the selected pixel with a selected threshold. Different values for the threshold can be selected. For example, in an 8-bit system, a gray value or a color value of 125 can be selected as the threshold. Further, the value of the threshold may be varied a function of the positions of the pixels within the image. For example, a practice of the invention can employ the method of U.S. Pat. No. 5,045,952, herein incorporated by reference, for dynamically adjusting the value of the threshold.

In a subsequent step 22, the illustrative method selects an output state based on the comparison of the color value of the pixel with the selected threshold. For example, in a printer employing a binary system, the output state can be selected from a set of two states, one indicating printing a dot on the print medium at a location corresponding to the pixel and the other output state indicating leaving the location blank. Those skilled in the art will understand that the number of output states are not limited to two. For example, a printer employing a quaternary system provides the option of selecting one of four output states for representing an electronically encoded pixel on a print medium. The method, for example, selects an output state corresponding to printing a dot if the color value of the pixel is greater than or equal to the threshed, and selects an output state corresponding to leaving the location blank if the color value of the pixel is less than the threshold.

The color level value of a selected output state representing an electronically encoded pixel typically differs from the value of the pixel. Accordingly, the illustrative method in a step 24 obtains the difference between the color value of the pixel and that of the output state as an error value. For example, if the printer prints a black dot having a gray scale value of 255 to represent a pixel having a gray scale value of 200, an error value of 55 arises.

In a subsequent step 26, the method obtains weighted fractional portions of the obtained error value. The weighted fractional portions are selected based on the color value of the electronically encoded pixel that is being processed, and are also based on the location of the pixel within the plurality of the pixels representing the continuous-tone image. A preferred practice of the invention selects the weighted fractional portions such that their sum is one. The method then modifies the color values of each pixel of a selected group of subsequent pixels by adding one of the weighted fractional portions to the color value of that pixel.

The method of the illustrative embodiment repeats the above steps for all the pixels of the image, to obtain an encoded display image for printing.

Referring again to FIG. 1, an exemplary application of the illustrative method described above to a representative pixel 28, located at a row n and a column m of the array 10, distributes an error value associated with the pixel 28 to a selected group of pixels 30, 32, 34, 36, 38, and 40 in the following manner. The method divides the error value indicative of the difference between the color value of the pixel 28 and an output state that will represent the pixel 28 on a print medium into six weighted fractional portions, and adds each weighted fractional portion to one of the six selected pixels 30–40. In particular, the method adds a 8/16 fraction of the error value to the neighboring pixel 30, located at a row n and a column m+1; adds a 4/16 fraction of the error value to the pixel 34, located at a row n+1 and a column m; adds a 2/16 fraction of the error value to the pixel 36, located at a row n+1 and a column m−1; adds a 1/16 fraction of the error value to the pixel 38, located at a row n+1 and a column m−2; and adds a 1/16 fraction of the error value to the pixel 40, located at a row n+1 and a column m−3. Further, the color value of the neighboring pixel 32, located at a row n+1 and a column m+1, is not modified. The illustrative weights are selected as a function of the position of the pixel 28 within the array 10, and also as a function of its color value. The sum of these weighted fractional portions, i.e., 8/16, 4/16, 2/16, 1/16, and 1/16, is one.

Although the weighted fractional portions in this example are normalized to one, those skilled in the art will understand that such a normalization of the weighted fractional portions is not a necessary condition for application of the method of the invention.

Figure 3:
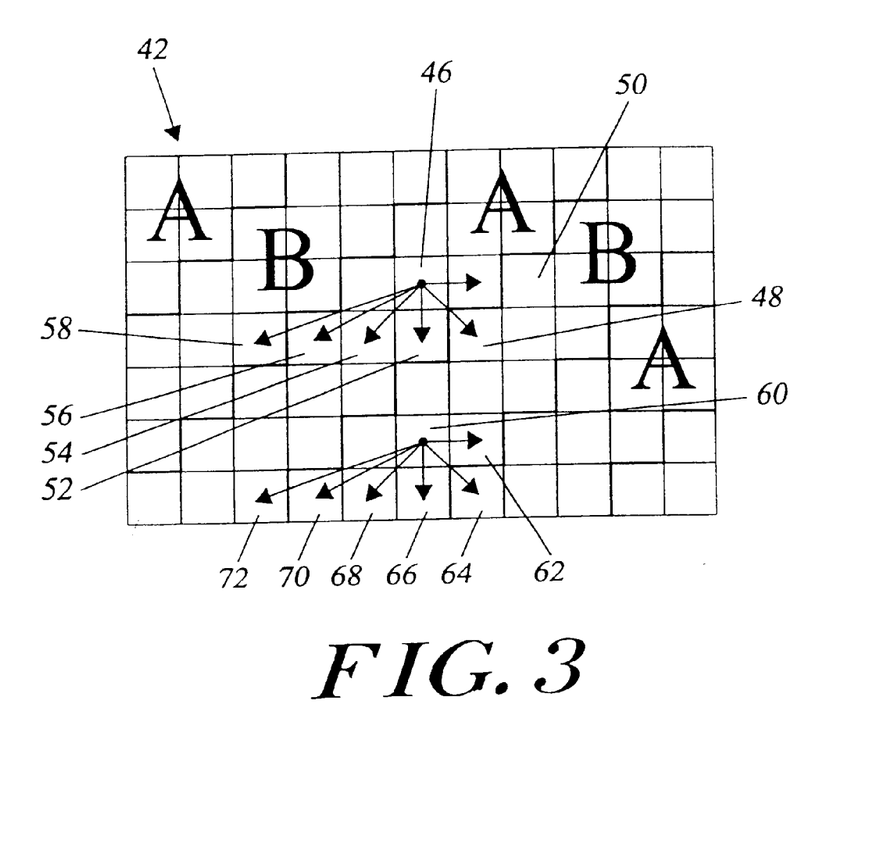
FIG. 3 is a two-dimensional array schematically depicting a plurality of electronically encoded pixels representing an image or a portion of an image, where the array is divided into a plurality of segments of two types, i.e., A segments and B segments, and further illustrating the distribution of error values associated with two representative pixels to selected groups of subsequent pixels in accord with the teachings of the invention.

One aspect of the method of the invention is selection of the weighted fractional portions based on both the color value of a particular pixel and its location within the image. FIG. 3 better illustrates this aspect of the invention by schematically depicting a two-dimensional array 42 of pixels representing an electronically encoded image. The array 42 is segmented into six regions of two types, where one type is designated by a letter 'A', and is herein referred to as an A segment, and the other type is designated by a letter 'B', and is herein referred to as a B segment. In this example, the weighted fractional portions of the error associated with the difference between the color value of a pixel and the output state representing the pixel are selected based on the color value of the pixel, and whether the pixel resides in an A segment or a B segment. The method of the invention preferably provides a segmentation of an array of electronically encoded pixels, e.g., the array 42, such that each segment is large enough to effectuate a break-up of patterns inherent in an error diffusion process, but small enough not to create textual differences among the segments.

Figure 4:
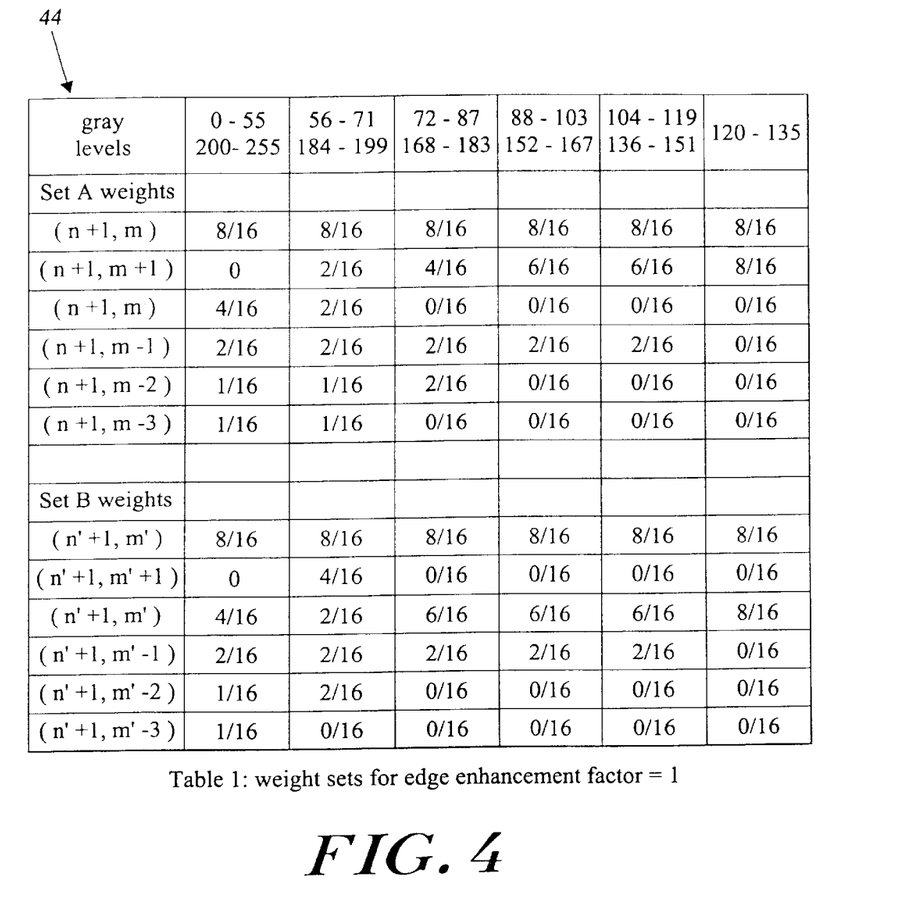
FIG. 4 is a Table that includes weights for forming weighted fractional portions of an error value associated with a pixel of FIG. 3, where the weights are based on the color value of each pixel and its position, i.e., whether the pixel resides in an A segment or a B segment.

In particular, FIG. 4 illustrates a Table 44 that includes a plurality of sets of weights for application to error values associated with the pixels in the array 42 (FIG. 2). Table 44 provides a set of fractional weights for each pixel as a function of the position of the pixel within the array 42, i.e., whether the pixel resides in an A segment or a B segment, and also as a function of the color value of the pixel. The set of weights designated as "Set A weights" apply to pixels in A type segments, and the set of weights designated as "Set B weights" apply to pixels in B type segments. The fractional weights provided in Table 44 can be better understood by considering the application of these weights to two exemplary pixels, each located in a different segment type of the array 44. For example, Table 44 provides fractional weights for a pixel 46 (FIG. 3) that resides in a an A segment at a row n and a column m, and has a color value, for example, of 225. Reference to Table 44 shows that the method of the invention distributes a 8/16 fraction of the error value associated with the pixel 46 to a neighboring pixel 48, located at a row n+1 and a column m; adds a 4/16 fraction of the error value to a pixel 52, located at a row n+1 and a column m; adds a 2/16 fraction of the error value to a pixel 54, located at a row n+1 and a column m−2; and adds a 1/16 fraction of the error value to a pixel 56, located at a row n+1 and a column m−3. Further, the method does not modify the color value of a neighboring pixel 50.

The application of the weights provided in Table 44 to another pixel 60, that resides in a B segment at a row n' and a column m', and has a color value, for example, of 80 results in fractional weight portions 8/16, 6/16, 2/16. The method adds the fractional portion 8/16 to a pixel 62, located at a row n'+1 and a column m'; adds the fractional portion 6/16 to a pixel 66, located at a row n'+1 and a column m'; adds the fractional portion 2/16 to a pixel 68, located at a row n'+1 and a column m'−1. The method does not modify the color values of pixels 64, 70, and 72, located, respectively, at a row n'+1 and a column m'+1, and at a row n'+1 and a column m'−2, and at a row n'+1 and column m'−3.

Hence, as shown in Table 44, the method of the invention provides weighted fractional portions of an error associated with a pixel as a function of both the color value of the pixel, and its position within an image. The selection of the weights based on both the color values of the pixels and their positions within the image advantageously destabilizes formation of artifacts, such as limit cycles patterns, thereby minimizing such artifacts in a printed image.

The error diffusion method of the invention can also be employed in conjunction with various edge enhancement methods. A number of edge enhancement methods are known in the art. For example, U.S. Pat. No. 5,045,952 of Eschbach, herein incorporated by reference, describes adjusting the threshold level of an error diffusion algorithm to control the degree of edge enhancement.

Figure 5:
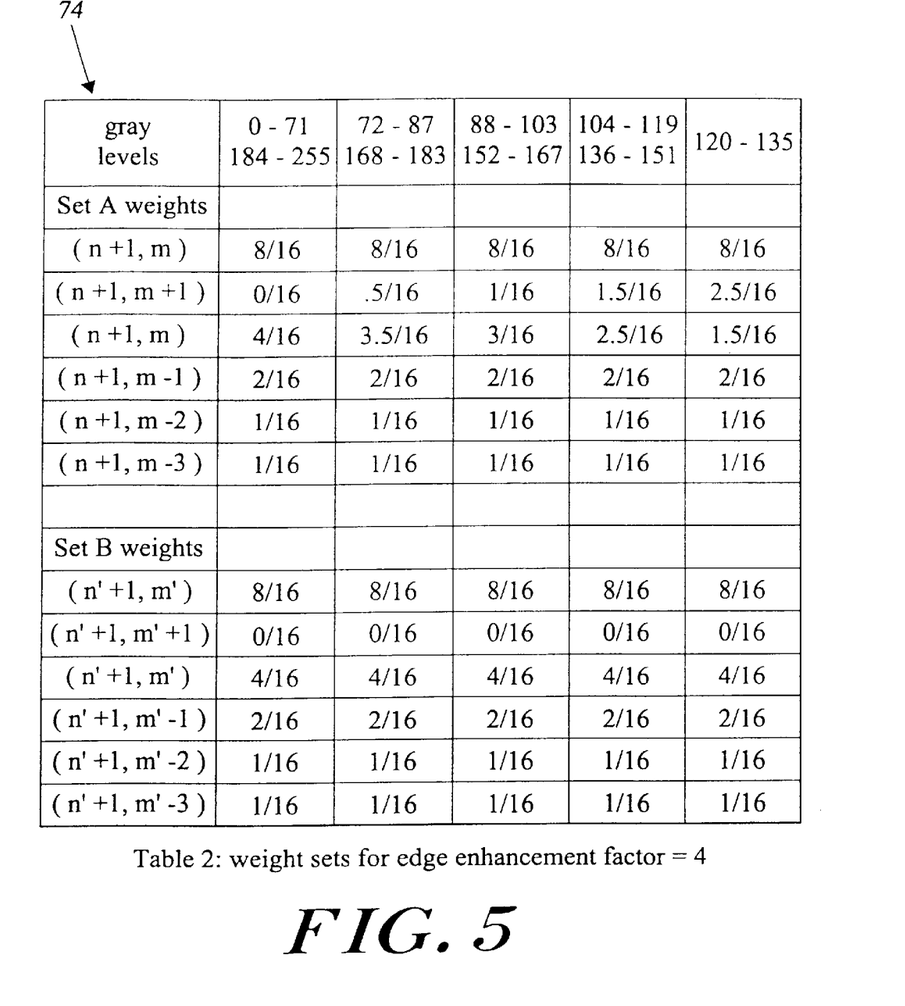
FIG. 5 is another Table that includes weights alternative to those of the Table of the previous figure for forming weighted fractional portions of an error value associated with a pixel of FIG. 3, where the pixels are processed with an edge enhancement factor of 4.

As an illustrative example of employing the error diffusion method of the invention with edge enhancement, FIG. 5 presents a Table 74 that includes a set of weights for distributing an error value associated with a pixel in the array 42 of FIG. 3 to a selected group of subsequent pixels. The weights presented in Table 74 can be employed to process the pixels of the two-dimensional array 42 (FIG. 3), with an edge enhancement factor of 4. For each pixel (n,m) in a type A segment, and for each pixel (n', m') in a type B segment, Table 74 provides fractional weights as a function of the color values of the pixel, which are selected to vary from 0 to 255. The method of the invention distributes an error associated with a pixel to selected subsequent pixels in accordance with these fractional weights, in a manner shown in FIG. 3.

The set of weights presented in Table 74, similar to those in Table 44, vary not only spatially, i.e., as a function of the position of the pixel, but also as a function of the color value of the pixel. However, the variations of the weights in Table 74 are less pronounced that those of Table 44. In general, in embodiments of the invention that employ edge enhancement, smaller variations in the weights, i.e., variations as a function of the pixel position and color value, can overcome the stability of artifacts, such as limit cycles artifacts, without forming observable edges in the image.

Those skilled in the art will understand that segmentation of a plurality of pixels representing an image is not limited to that shown in FIG. 3. Further, the fractional weights that can be employed in connection with a pixel having a particular position and color value are not limited to those provided in Tables 44 and 74. For example, the method of the invention can employ classical weights, such as Floyd-Steinberg weights, in some segments of the image, and spatially modulate these weights, i.e., employ a variation of these weights in the other segments, to destabilize error diffusion artifacts. Further, the method of the invention can assign the same weight to a set of contiguous pixels.

As the above discussion indicates, the present invention applies to both monochrome and color systems. For example, in a color system, each color component can be treated individually by the method of the invention.

Figure 6:
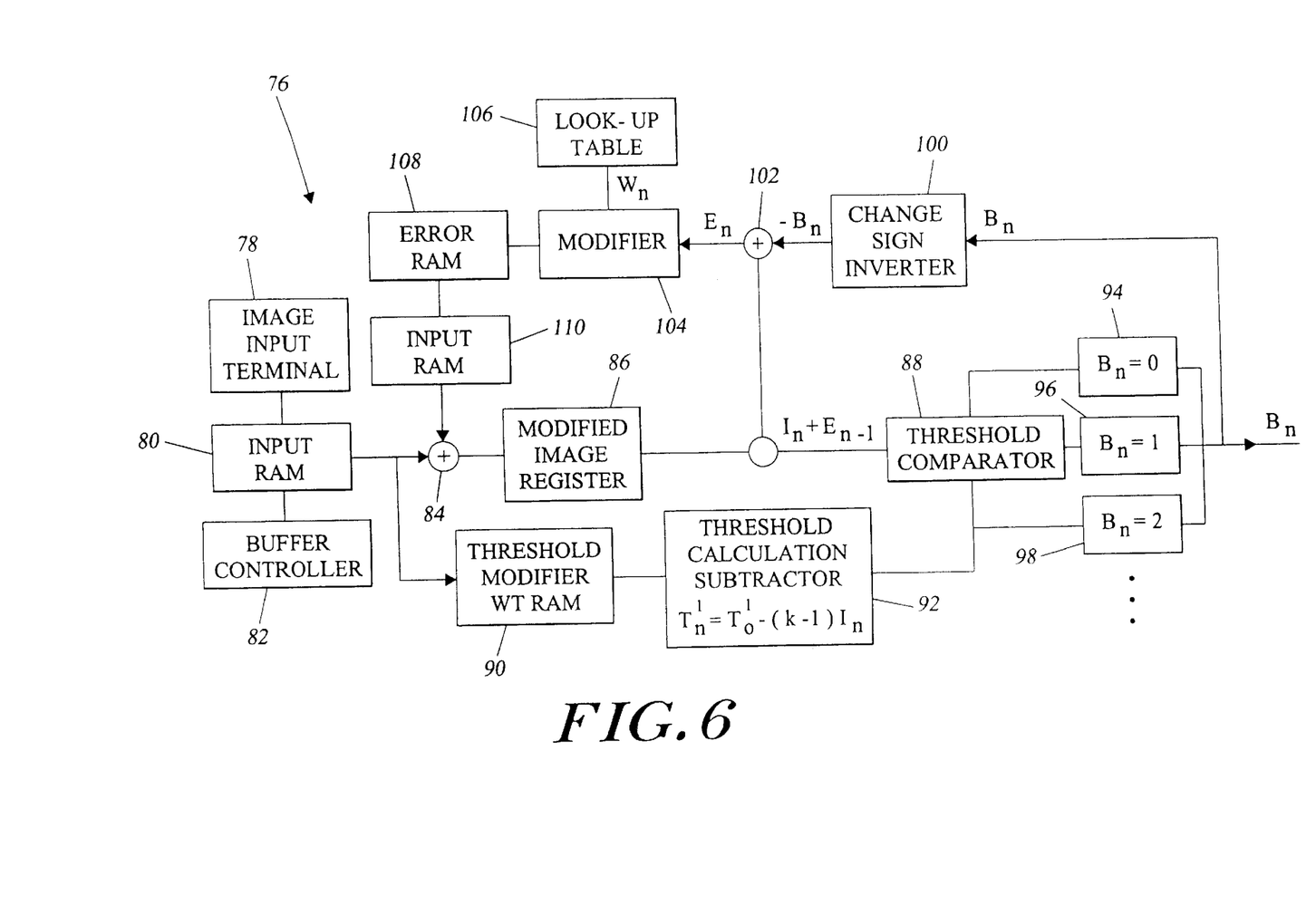
FIG. 6 is a circuit diagram of an image processing system according to the teachings of the present invention implementing the method of the invention for converting a continuous-tone image represented by electronically encoded pixels into an encoded display image for electronic printing.

FIG. 6 illustrates an exemplary circuit 76 for implementing the method of the invention. An image input terminal 78 transmits data corresponding to one or more complete full page image bitmaps to a random access memory (RAM) 80. A buffer controller 82 addresses the RAM 80 to introduce the image data pixel by pixel into the remaining portion of the circuit 76 for processing, where each pixel has a corresponding color value. For example, a pixel n being currently processed has a color value $I_n$. An adder 84 adds an error value $E_{n-1}$, obtained by processing a previous pixel n−1 according to the teachings of the invention, to the color value $I_n$, to produce a modified color value $I_n+E_{n-1}$, which is temporarily stored in a modified image register 86.

A threshold comparator 88 receives the modified color value $I_n+E_{n-1}$ and compares this value with a threshold value $T_n$, to determine an appropriate output state $B_n$, such as 0, 1, 2, ..., to be transmitted to an image output terminal. If the image output terminal is a binary printer, only two output states, i.e., 0 and 1, will be transmitted to the printer based on a comparison of the modified color value $I_n+E_{n-1}$ with the threshold $T_n$. For example, if the modified color value $I_n+E_{n-1}$ is greater than or equal to the threshold $T_n$, the output state $B_n=1$ is selected, and if $I_n+E_{n-1}$ is less than $T_n$, the output state $B_n=0$ is selected. The number of output states can be more than two for printers capable of representing a pixel by multiple output levels.

The threshold value $T_n$, can be a fixed value, or alternatively can be dynamically selected. The exemplary circuit 76 selects the threshold value dynamically. In particular, a threshold modifier look-up table (LUT) 90 stores, for each color value $I_n$, a threshold modifier (K−1). A modified value $I_n(K-1)$ is selected from the look-up table 90 in response to a color value $I_n$. A threshold calculation subtractor 92 subtracts the modified value $I_n(K-1)$ from a nominal threshold value $T_0$, to obtain the threshold value $T_n$, to be applied at the threshold comparator 88. The threshold comparator 88 compares the value of $I_n+E_{n-1}$ with the selected threshold and chooses one of a plurality of output states 94 ($B_n=0$), 96 ($B_n=1$), 98 ($B_n=2$), etc, as the selected output state for the pixel being processed.

In addition to the image output terminal (not shown), a change sign inverter 100 receives the selected output state $B_n$ and changes the sign of the output state $B_n$ to produce a reversed signed output state $-B_n$. An adder 102 adds $-B_n$ to the modified color value $I_n+E_{n-1}$ to obtain an error value $E_n$. A modifier 104 receives an appropriate fractional weight $W_n$ computed based on the position of the pixel n and its color value $I_n$ according to the teachings of the present invention, from a look-up table 106, to obtain a fractional error value $W_nE_n$ to be applied to a subsequent pixel n+1. The modified error value $W_nE_n$ is stored in a RAM 108. Further, a delay buffer 110 generates a single pixel delay to store the modified error value in a 1-dimensional situation.

While the present invention has been described with reference to above illustrative embodiments, those skilled in the art will appreciate that various changes in form and detail may be made without departing from the intended scope of the present invention as defined in the appended claims. In particular, the scope of the present invention is not limited to error diffusion algorithms, but encompasses any error feedback image processing algorithm.

What is claimed is:

1. A method for converting a continuous-tone image represented by electronically encoded pixels each specifying a color value into an encoded display image for electronic printing, comprising the steps of:

selecting each of said electronically encoded pixels sequentially, comparing the color value of the selected pixel with selected thresholds, selecting an output state from a set of output states for displaying said pixel based on the comparison of the color value with the selected thresholds, obtaining an error value indicative of a difference between said selected output state and said color value of the pixel, and modifying the color value of each of a selected group of subsequent pixels by a weighted fractional portion of said error value, said weighted fractional portion being selected based on the color value of said selected pixel and based on a position of said pixel within said continuous-tone image to provide an encoded display image.

2. The method of claim 1, wherein the step of modifying the color value includes selecting said weighted fractional portions such that a sum of said portions is one.

3. The method of claim 1, wherein the step of selecting each of said encoded pixels comprises the step of selecting said encoded pixels sequentially in a raster pattern.

4. The method of claim 1, wherein the step of selecting an output state includes the step of providing more than two output states.

5. The method of claim 1, wherein the step of modifying the color value includes the step of providing the same weighted fractional portions for a selected plurality of contiguous pixels.

6. The method of claim 1, wherein said electronically encoded pixels each specifying a color value form a two-dimensional array.

7. The method of claim 6 further comprising the step of dividing said two-dimensional array into a plurality of segments and wherein said weighted fractional portions are selected such that two pixels residing in the same segment and having color values in a selected range have the same weighted fractional portions.

8. The method of claim 7, further comprising the step of selecting said weighted fractional portions to be the same for a selected plurality of contiguous pixels in at least one of said plurality of segments.

9. The method of claim 1, wherein said set of states represents two output values, one of said output values indicating printing a dot at a selected location on a print medium and the other indicating leaving the selected location blank.

10. An image processing system for converting a continuous-tone image represented by a plurality of electronically encoded pixels, each having a color value, stored in an input buffer into an encoded image for electronic printing, comprising a buffer controller for sequentially selecting one of said pixels stored in said input buffer, a first summing circuit receiving the color value of said selected pixel and modifying said color value based on a fractional error value obtained from a previously processed pixel to obtain a modified color value, an image register receiving said modified color value and temporarily storing said modified value, a comparator receiving said modified value from said image register and comparing said modified value with a selected threshold to choose one of a plurality of output states based on said comparison, said selected output state representing said selected pixel in the encoded image, a change sign inverter receiving said selected output state and producing a sign-inverted output state, a second summing circuit receiving said modified color value and said sign-inverted output state to produce an error value indicative of a difference between said modified color value and said output state, a modifier receiving said error value from said summing circuit and receiving a weighted fraction from a lookup table and modifying said error value based on said weighted fraction to obtain a fractional error value to be applied to a subsequent pixel, said weighted fraction being selected based on the color value of said selected pixel and its position within said electronically encoded image, and an error buffer for storing said fractional error value.

11. The image processing system of claim 10, further comprising an output buffer for storing said selected output state value.

12. The image processing system of claim 10, wherein said continuous-tone image includes a two-dimensional array of electronically encoded pixels each specifying a color value.

13. The image processing system of claim 12, wherein said buffer controller is configured to sequentially select said pixels in a raster pattern.

14. The image processing system of claim 10, further comprising a threshold modifier receiving the color value of said selected pixel to calculate a threshold modifying value based on said color value and a multiplier, a threshold calculation substractor receiving said threshold modifying value and subtracting said threshold modifying value from a nominal threshold value to obtain said selected threshold value.

15. A printer for printing an image of a continuous-tone representation of a plurality of electronically encoded pixels each specifying a color value as a pattern of dots on a print medium, each dot representing a selected output state value, comprising a segmenting element which segments the plurality of electronically encoded pixels into a plurality of segments, an error diffuser receiving said plurality of pixel values and converting said pixel values into an encoded display image, said diffuser distributing fractional portions of a difference between a color value of a pixel and the output state value of a dot representing said pixel to selected subsequent pixels based on color value of said pixel and based on which segment of the plurality of segments said pixel is located, and a printing mechanism responsive to said encoded display image for generating the pattern of dots on the print medium.

16. The printer of claim 15, wherein said electronically encoded pixels form a two-dimensional array.

17. The printer of claim 15, wherein said diffuser provides said fractional portions based on said difference between a color value of a pixel and the output state value of a dot representing the pixel and adds said fractional portions to selected subsequent pixels.

18. The printer of claim 15, wherein said printing mechanism includes an ink-jet printing device.

19. A method for converting a continuous-tone represented as a two-dimensional array of electronically encoded pixels each specifying a gray scale value into an encoded display image for electronic printing, comprising the steps of segmenting the two-dimensional array of electronically encoded pixels into a plurality of regions, comparing the gray scale value of a selected pixel with a selected threshold, selecting an output state from a set of binary states for displaying said pixel based on the comparison of the gray scale value with the selected threshold, obtaining an error value indicative of a difference between said selected output state and said gray scale value of the pixel, dividing said error value into a plurality of fractional error values based on which segment said selected pixel is located within said segmented two-dimensional array and based on the gray scale intensity of said pixel, adding to each of a selected plurality of subsequent pixels one of said fractional error values based on a relative position of said subsequent pixel to said selected pixel, repeating the above steps for each pixel in said array to produce an encoded display image.

* * * * *